United States Patent [19]
Yamauchi et al.

[11] Patent Number: 5,370,107
[45] Date of Patent: Dec. 6, 1994

[54] IGNITING AND HEATING MECHANISM

[75] Inventors: Kunio Yamauchi, Shiga; Kenji Ikemoto, Fuchu; Taiji Matsumura, Tokyo, all of Japan

[73] Assignee: Nissin Shokuhin Kabushiki Kaisha, Osaka, Japan

[21] Appl. No.: 16,061

[22] Filed: Feb. 10, 1993

[30] Foreign Application Priority Data

Feb. 14, 1992 [JP] Japan ............... 4-028541

[51] Int. Cl.⁵ .............................................. F24J 1/00
[52] U.S. Cl. .......................... 126/263 R; 102/202.8
[58] Field of Search ............... 126/263; 102/202.8; 431/362

[56] References Cited

U.S. PATENT DOCUMENTS

| | | | |
|---|---|---|---|
| 1,562,137 | 11/1925 | Barnes | 126/263 |
| 2,868,003 | 1/1959 | Albrecht | 431/362 |
| 3,527,201 | 9/1970 | Epstein et al. | 126/263 |
| 5,018,505 | 5/1991 | Suzuki et al. | 126/263 |

FOREIGN PATENT DOCUMENTS

| | | |
|---|---|---|
| 0399804A1 | 11/1990 | European Pat. Off. |
| 1126529 | 11/1956 | France |
| 01288218 | 11/1989 | Japan |
| 02007918 | 1/1990 | Japan |
| 04031270 | 3/1992 | Japan |
| 04150813 | 5/1992 | Japan |

*Primary Examiner*—Carroll B. Dority
*Attorney, Agent, or Firm*—Marshall, O'Toole, Gerstein, Murray & Borun

[57] ABSTRACT

This disclosure relates to a container having a heating function which requires no complicated electric circuit and is free of incorrect operation, and to a heat conversion apparatus and a compact ignition apparatus for the container. The ignition apparatus comprises a piezoelectric element, a pressure-exerting apparatus for applying pressure to the piezoelectric element, a sensing device for sensing whether the container contains a desired material to be heated, a heat conversion apparatus for converting electric energy generated by the piezoelectric element into thermal energy to generate heat at high temperature, and an escaping discharge or spark gap device for discharging the electricity generated by the piezoelectric element at a place well away from the exothermic system when the sensing device does not sense that the container is filled with the desired material to be heated.

8 Claims, 6 Drawing Sheets

FIG. 5
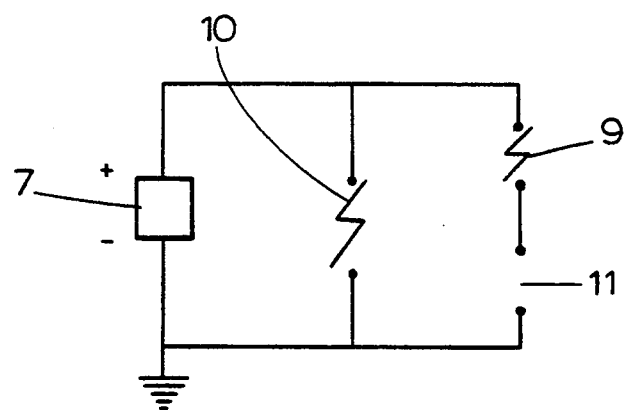
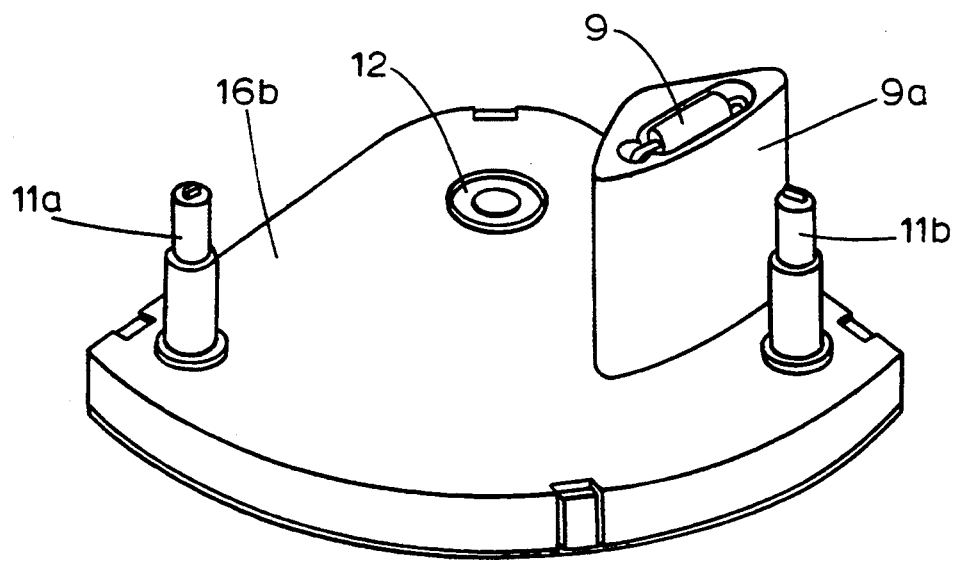
FIG. 6

IGNITING AND HEATING MECHANISM

FIELD AND BACKGROUND OF THE INVENTION

This invention relates to heat conversion apparatus which converts electrical energy into thermal energy and generates heat at high temperature, an ignition apparatus for igniting an exothermic system to generate heat from thereof and having a mechanism for avoiding unintended ignition, and a container with a heating function and including said ignition apparatus.

Heated containers have been in use for some years, which utilize heat generated by the self-combustion of an exothermic agent comprising an oxygen feeder and a combustible material. For instance, there are containers shown in Japanese Utility Model Provisional Publication Nos. 62-146427 and 63-42089. In these heated containers, the exothermic agent is ignited by such means as a safety fuse or a filament type electric heater connected to the exothermic agent.

The foregoing heated containers, however, are very inconvenient to use because an igniter, such as match, lighter, or a battery for operating the filament type electric heater, is separately needed. In particular, when the exothermic agent is arranged to be ignited by means of a safety fuse, there are problems such as the difficulty of use of the heated container outdoors, in rainy weather or in strong wind.

To solve the above-mentioned problems of the prior art and to improve the ignition performance, heat efficiency and heating speed, the present inventors have already proposed a variety of heated containers in which the exothermic system comprises an exothermic agent, an ignition agent arranged close to the exothermic agent and more easy to ignite than the exothermic agent, and an ignition part arranged close to the ignition agent.

For instance, in the Japanese Patent Provisional Publication No. 4-31270 of the present inventors, there is proposed a container with a heating function, which is provided with a piezoelectric element for receiving a pressure from a device having a striking force, to generate electricity, a hammer member for striking the piezoelectric element, a sensing device for sensing whether the container is filled with water or fluid of which the main component is water, ignition discharge electrodes for discharging electricity, and escaping discharge electrodes.

The foregoing container with a heating function, however, involved a risk of heat generation due to improper operation. A high voltage generated by the piezoelectric element may generate unwanted electric noises due to electrostatic induction, electromagnetic induction, leakage of current, radiation, etc. As a result, even when the circuit between the sensing electrodes is not closed, a voltage may be applied across the ignition discharge electrodes, and if the voltage is excessively large, even when the container is not filled with the material to be heated, the ignition operation may cause a spark discharge across the ignition discharge electrodes to ignite the exothermic system.

To solve this problem, the present inventors have proposed a container with a heating function, in which the voltage generated by the piezoelectric element was reduced to eliminate the escaping discharge electrodes, and, moreover, an electric circuit was provided to stabilize the electric pulses and reduce unwanted electric pulses so as to prevent ignition by improper operation. Furthermore, the inventors have proposed a bulb (see Japanese Patent Provisional Publication No. 4-150813) as a heat conversion apparatus which virtually converts electric energy into thermal energy and generates heat at high temperature for use in the above-mentioned container with a heating function. The bulb can be operated at a low voltage and has the following configuration: A thin metallic wire is sealed in a container containing oxygen, and a pair of separated electrodes are provided in the container. The surfaces of the electrodes are coated with an ignition agent which is an insulator or a resistor having a high resistance.

In this case, however, an extra electric circuit was required for stabilizing and reducing the electric pulses. The configuration of the circuit was complex, and the production process thereof was also complex and the cost was high since expensive electronic components were used. In addition, it was necessary to seal the metallic thin wire, etc. in the bulb used as the heat conversion apparatus, and the production process was complex, resulting in a higher cost.

In view of the above mentioned problems, one object of the present invention is to provide a container with a heating function, which requires no complicated electric circuit for stabilizing and reducing electric pulses and is free of any possibility of heat generation due to improper operation wherein a wrong ignition operation actuates the heat conversion apparatus to ignite the exothermic system.

Another object of the present invention is to provide a compact ignition apparatus having a simple construction, which requires no complicated electric circuit for stabilizing and reducing electric pulses and is free of any possibility of improper operation wherein an improper ignition operation actuates the heat conversion apparatus to ignite the exothermic system.

Another object of the present invention is to provide a heat conversion apparatus which is not actuated by a low voltage but requires a relatively high voltage and is applicable for said container with a heating function or ignition apparatus.

SUMMARY OF THE INVENTION

The present invention avoids the above-mentioned problems and achieves the above objectives, and comprises a heat conversion apparatus which virtually converts electric energy into thermal energy and generates heat at high temperature, the heat conversion apparatus being characterized in that it comprises a pair of electrodes separately arranged to oppose each other in a container, one electrode being in the form of a needle, the other electrode being coated with an ignition agent, and the container being filled with oxygen and sealed.

The present invention also comprises an ignition apparatus for igniting an exothermic system, the ignition apparatus being characterized in that it comprises a piezoelectric element for receiving pressure from a force (such as striking force) to generate electricity, a pressure-exerting device for applying pressure to the piezoelectric element, a sensing device for sensing whether the container for containing a desired material to be heated is filled with the material to be heated, the heat conversion apparatus virtually converting electric energy into thermal energy and generating heat at high temperature when the sensing device detects that the container is filled with the desired material to be heated, and an escaping discharge device for discharging the electricity generated by the piezoelectric element at a place well away from the exothermic system when the sensing device does not sense that the container is filled with the desired material to be heated, wherein the piezoelectric element, sensing device, heat conversion apparatus and escaping discharge device are mutually and electrically connected.

Furthermore, the present invention comprises a container with a heating function characterized in that the container is provided with an exothermic system for heating a material to be heated, and an ignition apparatus for igniting the exothermic system to release heat, the material to be heated being contained in the container and comprising water or a fluid of which the main component is water, or a mixture of water or the fluid and a solid.

BRIEF DESCRIPTION OF THE DRAWINGS

The invention will be better understood from the following detailed description taken in conjunction with the accompanying figures of the drawings, wherein:

FIG. 5 is an electric circuit diagram of the ignition apparatus according to the present invention;

FIG. 6 is a perspective view showing the assembled state of the ignition apparatus according to the present invention;

DETAILED DESCRIPTION

Figure 1:
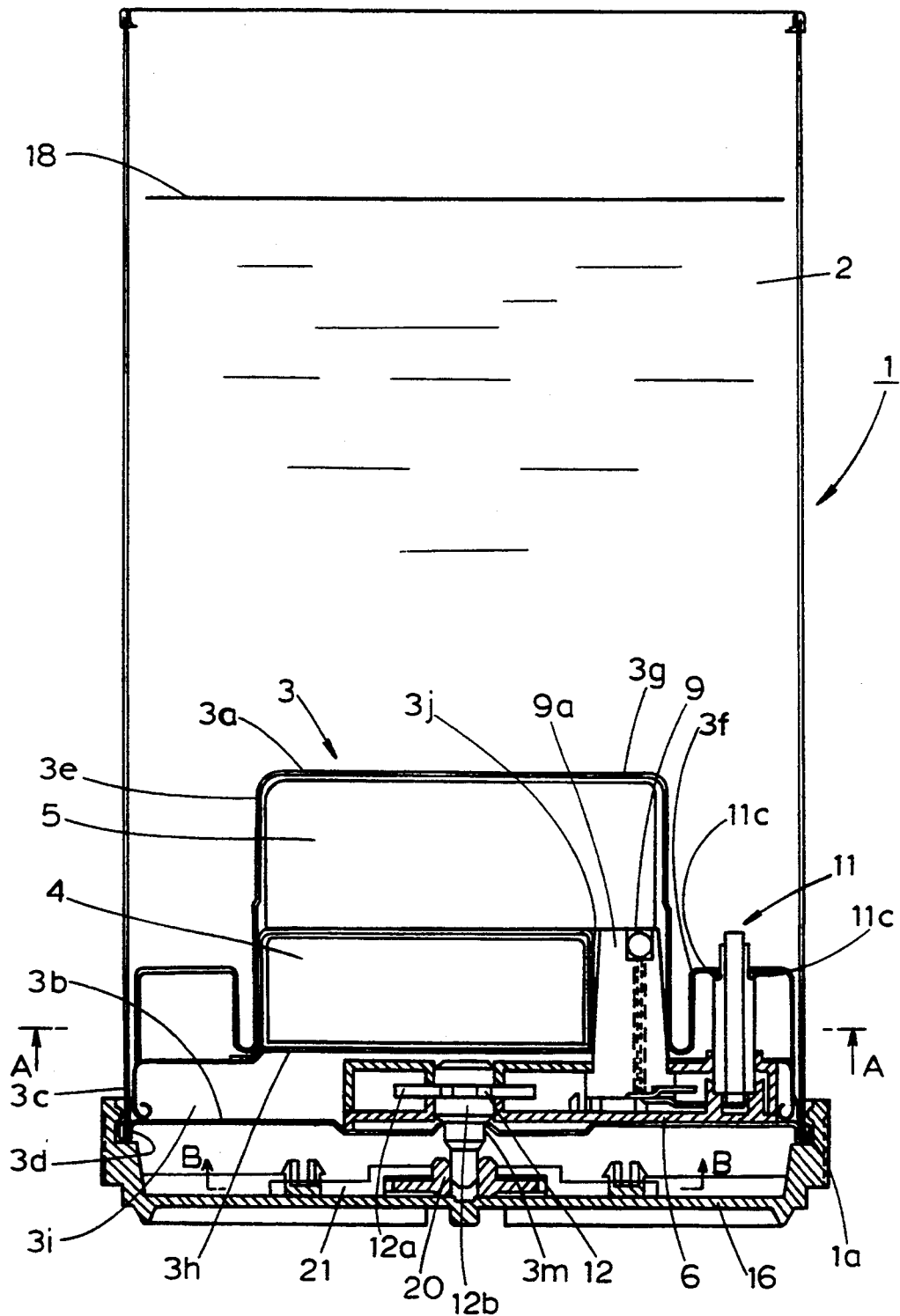
FIG. 1 is a longitudinal sectional view of one embodiment of a container with a heating function according to the present invention.

As shown in FIG. 1, a roughly cylindrical container proper 1 made of metal, preferably of steel, is provided, and in the lower part thereof is an exothermic system container 3 also made of metal. The exothermic system container 3 comprises an upper cover 3a also functioning as the bottom cover of the container proper 1 and a lower cover 3b. As described later, an exothermic system 5, an insulator 4, and an ignition apparatus 6 are contained inside the exothermic system container 3.

The entire outer circumference 3c of the upper cover 3a and the entire outer circumference 3d of the lower cover 3b are hermetically sealed and fixed to the lower end 1a of the container proper 1 so that the contents 2 within the container proper 1 do not leak out of the container 1. The upper cover 3a comprises an exothermic block storing part 3e protruding at the center in a cylindrical form to contain the exothermic unit 5 and the insulator 4, and a sensing electrode storing part 3f protruding, along the outer circumference of the exothermic block storing part 3e and also along the inner circumference of the container proper 1, in the form of a doughnut to store the sensing electrodes 11. The exothermic block storing part 3e is partitioned into a cylindrical exothermic system storing part 3g for containing the exothermic system 5 and a roughly-cylindrical insulator storing part 3h for storing the insulator 4. Beneath the exothermic block storing part 3e and sensing electrode storing part 3f, an ignition apparatus storing part 3i is formed to store the ignition apparatus 6.

Figure 7:
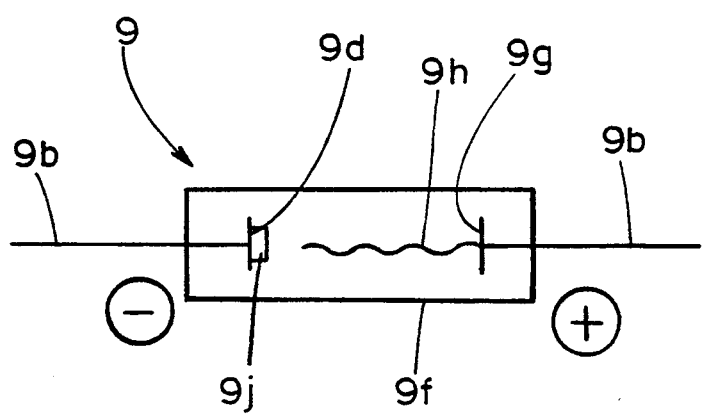
FIG. 7 is a schematic diagram showing a heat conversion apparatus according to the present invention.

The heat conversion apparatus according to the present invention comprises a pair of electrodes separately arranged to oppose each other in a container, one electrode being in the form of a needle and the other electrode being coated with an ignition agent, and the container being filled with oxygen and sealed hermetically. The basic electric circuit of the apparatus is as shown in FIG. 7. The apparatus is designed to virtually convert electric energy into thermal energy and generate heat at high temperature. The details of the apparatus are as described later. The form of the apparatus may be designed in a desired form such as a bulb form and a diode form. An integrally formed apparatus may be called an ignition element or an ignition bulb (hereinafter referred to as "ignition bulb"). To assure the reliable connection of the lead wires to the circuit and to reliably hold the ignition bulb, it is desirable to mount the ignition bulb in an ignition bulb holding member and use them as a set.

Figure 2:
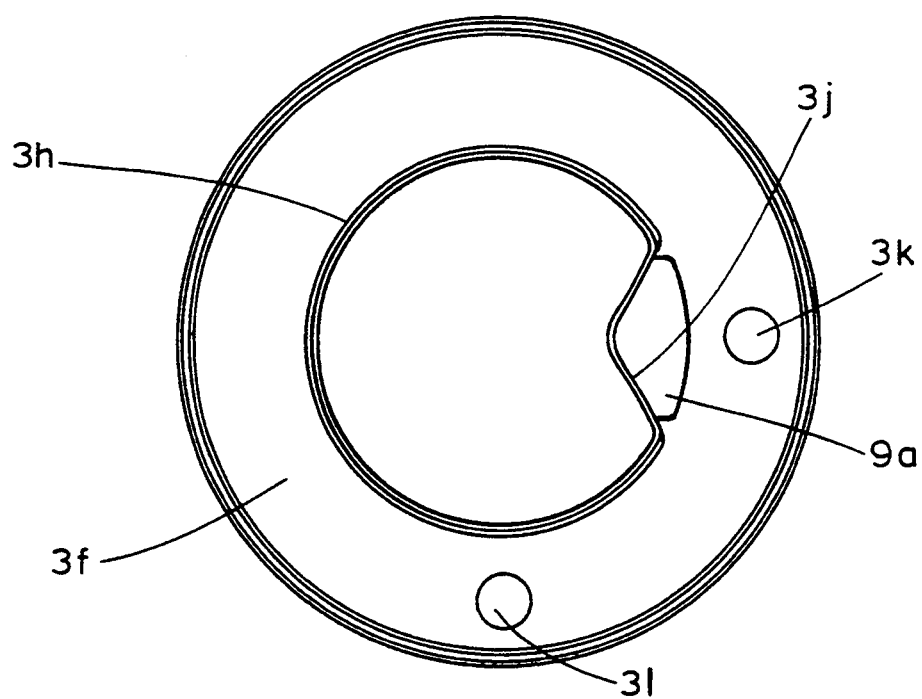
FIG. 2 is a sectional view taken along the line A—A of FIG. 1.

As shown in FIG. 2, the insulator storing part 3h is provided with an ignition bulb support member space 3j into which an ignition bulb support member 9a of the ignition apparatus 6 is inserted. The space 3j is formed in the part 3h in such a way that a portion of the insulator storing part 3h is removed and the space 3j extends into the insulator 4. The sensing electrode storing part 3f is provided, on the outer side of the ignition bulb support member space 3j, with a sensing electrode insertion hole 3k for insertion of a sensing electrode 11, and with a sensing electrode insertion hole 3l at a place angularly separated from the sensing electrode insertion hole 3k.

Moreover, as explained later, in the center of the lower cover 3b of the exothermic system container 3, is provided an opening 3m for a drive shaft which is rotatable to drive a trigger member 12 for actuating the ignition mechanism of the ignition apparatus 6.

Figure 3:
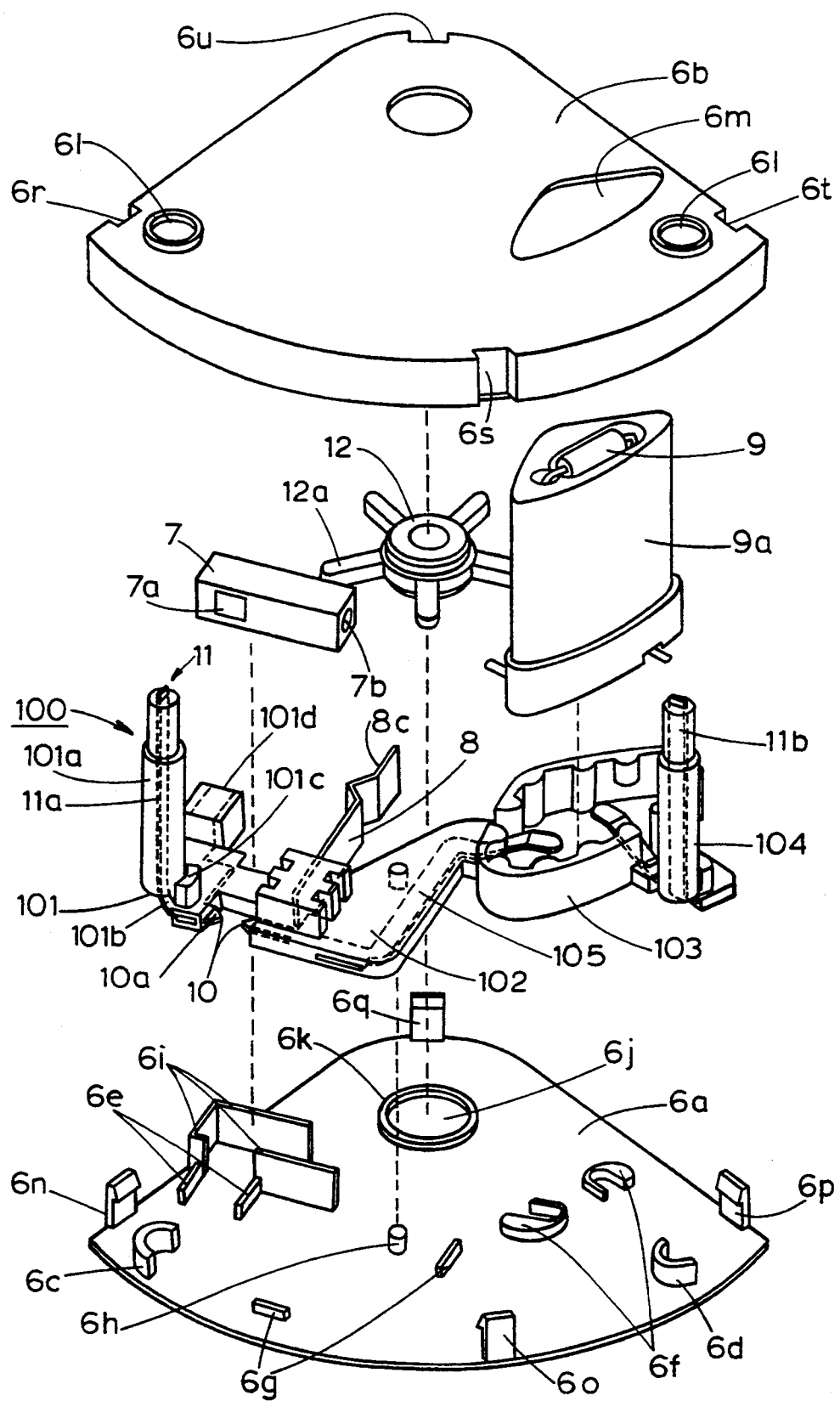
FIG. 3 is an exploded view of an ignition apparatus according to the present invention.

As shown in FIG. 3, the ignition apparatus comprises a piezoelectric element 7, a hammer member 8 of a pressure-exerting device, escaping electrodes 10 forming an escaping discharge device, sensing electrodes 11 forming a sensing device, the ignition bulb 9 being the heat conversion apparatus, etc. which are arranged and stored in a container to make the electric circuit shown in FIG. 5. The container comprises a lower cover 6a (FIG. 3) integrally formed of a synthetic plastic, etc. and an upper cover 6b forming a pair with the lower cover 6a.

Figure 4:
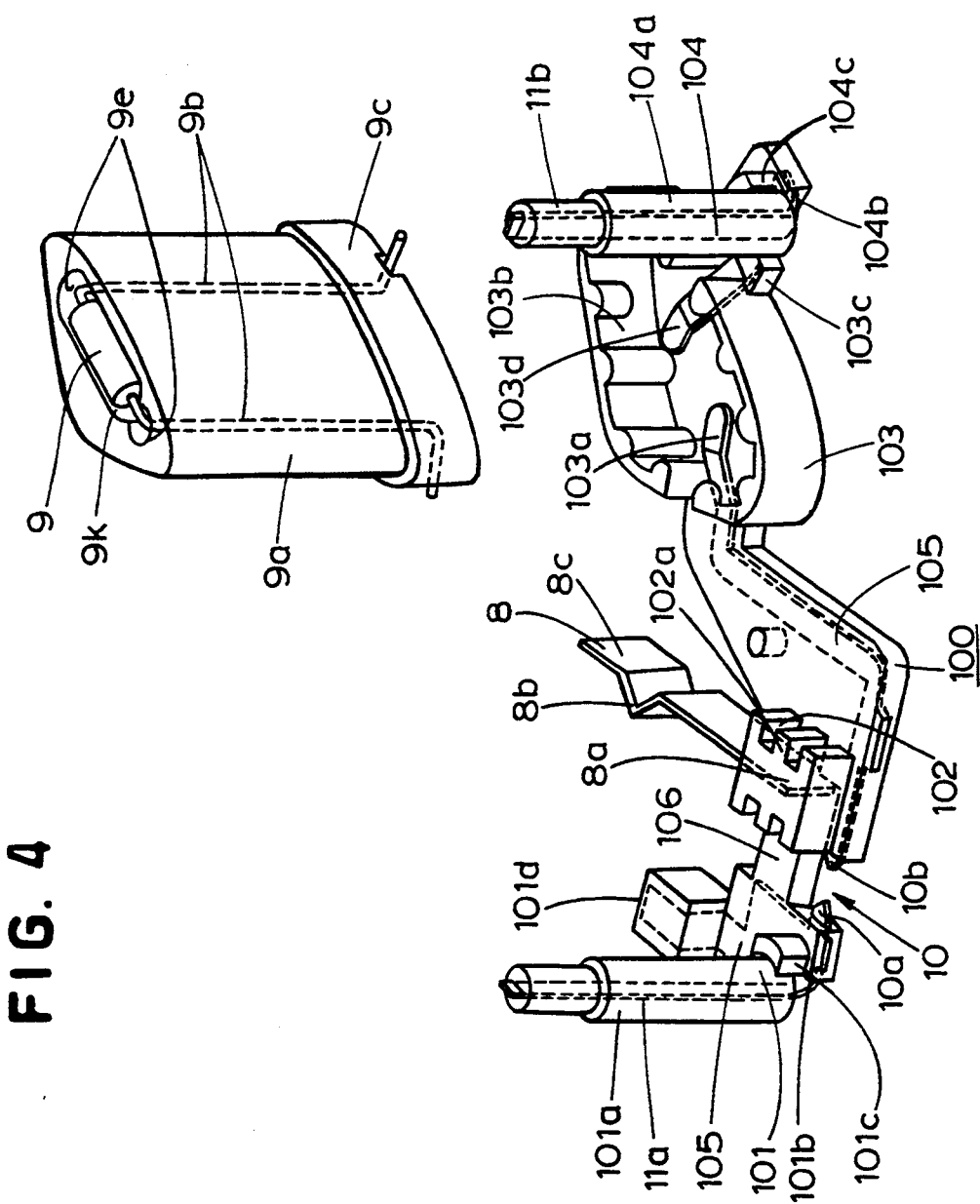
FIG. 4 is a perspective view showing an electric circuit component of the ignition apparatus according to the present invention.

To be more specific, as shown in FIG. 4, a sensing electrode part 101 comprising one sensing electrode 11a, a hammer part 102 comprising the hammer member 8, an ignition bulb support part 103 for mounting the ignition bulb support member 9a with the ignition bulb 9, and a sensing electrode part 104 comprising the other sensing electrode 11b are electrically connected by means of metallic plate conductors 105 (illustrated by dotted lines in the diagram) to form an electric circuit shown in FIG. 5, and they are integrally molded with a synthetic resin into an electric circuit component 100.

In the sensing electrode part 101, one sensing electrode 11a comprising one end of one conductor 105 is covered by a sensing electrode support member 101a which is made of the synthetic resin. The sensing electrode 11a is raised vertically by bending the conductor 105 (FIGS. 3 and 4) at the root end 101b of the sensing electrode 11a. The electrode 11a is in contact with and is supported by a sensing electrode support piece 101c. At the root end of the sensing electrode 11a, one electrode 10a of the escaping electrodes 10 is formed by the conductor 105 on one side, and a contact 101d for connecting to one pole 7a of the piezoelectric element 7 is formed by the conductor 105 on the other side.

On the other hand, one side of the hammer part 102 is connected to the sensing electrode part 101 through the connecting part 106. The root end 8a of a flat-spring-like hammer member 8 is supported by a hammer support member 102a. At the root end 8a of the hammer member 8, an electrode 10b is formed by one conductor 105 on one side, the electrode 10b forming a pair with the electrode 10a of the escaping electrode 10 and being separated at a certain distance from the electrode 10a. On the other side of the root end 8a, the conductor 105 forms a contact 103a protruding into the inner space of a fixed ring member 103b of the ignition bulb support part 103. The contact 103a is connectable with a lead 9b connected to the ignition bulb 9.

The ignition bulb support part 103 comprises the fixed ring member 103b which has the roughly triangular shape of the bottom 9c of the ignition bulb support member 9a so that the bottom 9c can be inserted into the fixed ring member 103b. A sensing electrode 104 is connected to one end of the ignition bulb support part 103, and the electrode 104 forms a sensing electrode 11b which forms a pair with the sensing electrode 11a. As for the fixed ring member 103b, the contact 103a protrudes into the inner space of the fixed ring member 103b, and a contact 103d of the sensing electrode 11b also protrudes into the space from the connection 103c of the sensing electrode part 104. The sensing electrode 11b is also covered, like the sensing electrode 11a, with a sensing electrode support member 104 which is made of the synthetic resin. The sensing electrode 11b is raised vertically by bending the conductor 105 at the root end 104b thereof. The electrode 11b is in contact with and is supported by a sensing electrode support piece 104c.

The ignition bulb support member 9a is made of ceramic to prevent it from being melted by the heat generated at the time of ignition of the ignition bulb 9. A bulb mounting detent 9k is formed in the top of the ignition bulb support member 9a, and wiring holes 9e, 9e are made in the detent 9k for leads 9b, 9b of the ignition bulb 9. The ignition bulb 9 is, as shown in FIG. 7, a container 9f in the form of a bulb, diode, etc., preferably made of heat-resisting glass, in which electrodes 9d, 9g are arranged and oxygen is sealed within. On one electrode 9g, a needle-like electrode wire, preferably a metal whisker 9h such as a tungsten whisker is mounted and extends toward the other electrode 9d. The electrode 9d is coated with an ignition agent 9j such as a powder of a metal like iron, cobalt, nickel and zirconium, a powder of an alloy of such metals, or a powder of so-called pyrophoric alloy (for instance, alloys of mischmetal with iron, nickel or copper, alloys of lanthanum with magnesium, lead or tin, and vanadium-iron alloy). As a result, when a spark discharge is generated between the electrodes 9d and 9g, the ignition agent 9j at the top end of the electrode 9d will be ignited. This, in turn, with the help of the oxygen filled in the ignition bulb, will cause rapid combustion and generate heat at high temperature. The ignition bulb container 9f will be instantly ruptured to release heat energy at very high temperature. Since the ignition bulb 9 is set almost in contact with the bottom of the exothermic system 5, the thermal energy at high temperature of the ignition bulb 9 will be directly used as the ignition energy for the exothermic system 5. Thus ignition of the exothermic system 5 can be made easily and reliably.

Moreover, since the ignition bulb according to the present invention is configured as shown in FIG. 7, the operating voltage at the start of the discharge can be adjusted as one thinks fit by adjusting the distance between the electrodes 9d and 9h or by selecting the material of the metal whisker 9h. In the present invention, in consideration of the strength of the hammer member 8, the voltage generated by the piezoelectric element, unwanted electric noises, etc., it is desirable to adjust and set the ignition bulb so that the ignition bulb is not actuated by a low voltage but a relatively high voltage.

The electric circuit component 100 thus configured is mounted on the lower cover 6a in such a way that the sensing electrodes 101, 104 engage sensing electrode fixing pieces 6c, 6d protrudingly formed on the lower cover 6a to fix and support the electrodes 101, 104. The contact 101d of the sensing electrode 101 engages a contact fixing piece 6e for fixing and supporting the contact 101d, the fixed ring member 103b of the ignition bulb support part 103 engages a fixed ring member fixing piece 6f for fixing and supporting the member 103b, and the hammer part 102 engages hammer part fixing pieces 6g, 6h, respectively.

The piezoelectric element 7 is mounted to engage piezoelectric element fixing pieces 6i formed on the lower cover 6a. One pole 7a of the piezoelectric element 7 is arranged to engage the contact 101d of the sensing electrode part 101. On the other hand, the other pole 7b of the piezoelectric element 7 is in electric contact under normal condition with a striker 8b formed in the hammer member 8. The hammer member 8 itself constitutes a part of the electric circuit.

The bottom 9c of the ignition bulb support member 9a is inserted into the fixed ring member 103b of the ignition bulb support part 103, and the leads 9b, 9b, which project out of the bottom 9c of the ignition bulb support member 9a, come into contact with the contact 103a of the hammer part 102 and the contact 103d of the sensing electrode part 104, respectively. The lower cover 6a is provided with an opening 6j. Around this opening 6j, a trigger member mounting projection 6k is formed. A trigger member 12 is rotatably mounted in the projection 6k.

Thus the piezoelectric element 7, hammer member 8, escaping electrodes 10 and sensing electrodes 11, ignition bulb 9, etc. are first mounted on the lower cover 6a. After that, the sensing electrodes 11 are inserted into sensing electrode holes 61, 61 formed in the upper cover 6b, and the ignition bulb support member 9a is inserted into an ignition bulb support member hole 6m also formed in the upper cover 6b. Then the upper cover 6b is closed and mating pieces 6n, 6o, 6p, 6q formed on the lower cover 6a are mated with the mating grooves 6r, 6s, 6t, 6u made in the upper cover 6b to assemble the ignition apparatus 6 (see FIG. 6).

When arranged as described above, the ignition bulb 9 and the sensing electrodes 11 are connected in series, and they are connected in parallel with the escaping electrodes 10 (see FIG. 5), and the resulting assembly is connected to the positive and negative poles of the piezoelectric element 7 to form the electric circuit shown in FIG. 5.

The ignition apparatus 6 thus assembled is set properly in the ignition apparatus storing part 3i of the exothermic system container 3; at the same time, the ignition bulb support member 9a is inserted into the ignition bulb support member space 3j of the exothermic system container 3, and the sensing electrodes 11a, 11b are inserted into the sensing electrode holes 3l, 3k of the sensing electrode storing part 3f, respectively. The sensing electrodes 11 are provided with seal rings 11c to prevent the content 3 from leaking through the sensing electrode holes 3l, 3k and into the exothermic container 3 and disturbing the operation of the ignition mechanism.

The lower cover 3b of the exothermic system container 3 is provided with the opening 3m at the center thereof, and a shaft member 12b of the trigger member 12 of the ignition apparatus 6 is passed through the opening 3m. The shaft member 12b is connected to a pawl wheel 20, which is explained later, of a ratchet gear 21 on a bottom cover 16.

Figure 8:
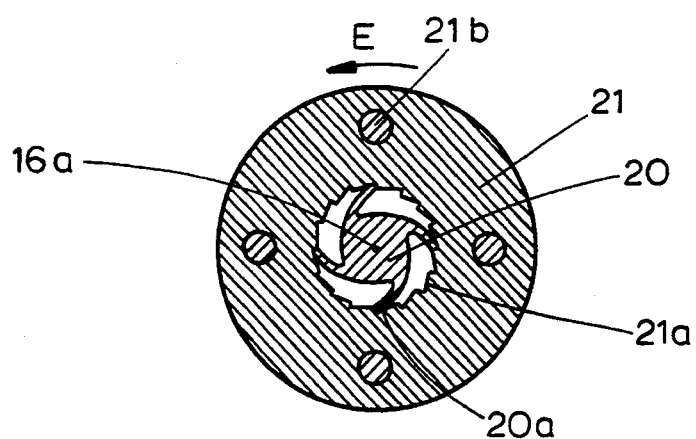
FIG. 8 is a sectional view along the line B—B of FIG. 1.
Figure 9:
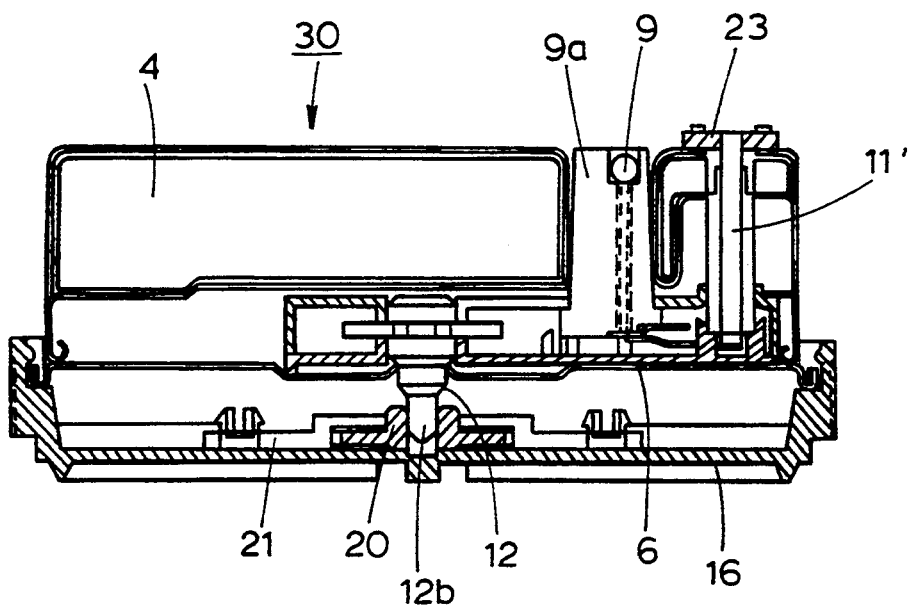
FIG. 9 is a longitudinal sectional view showing an alternative embodiment of the ignition apparatus according to the present invention.

As shown in FIG. 1 and FIG. 9, at the bottom of the container proper 1, the bottom cover 16 is rotatably mounted on the container proper 1. At the center of the bottom cover 16, the ratchet gear 21 (FIG. 8) having teeth 21a formed inwardly and directed in one direction, is fixed onto the bottom cover 16 by fixing members 21b. The pawl wheel 20 is rotatably mounted in the ratchet gear 21, with the center of the bottom cover 16 being the axis 16. The pawl wheel 20 has a plurality of projecting pawls 20a, and these pawls 20a engage the teeth 21a formed on the inner circumference of the ratchet gear 21 (see FIG. 8).

The upper part of the pawl wheel 20 is connected to the trigger member 12 via the shaft member 12b. The shaft member 12b may be integrally formed with the trigger member 12 or with the pawl wheel 20 in advance, and may be fit into the pawl wheel 20 or the trigger member 12 so that they have a common axis of rotation. Alternatively, the trigger member 12 and the pawl wheel 20 may be produced separately. Then they may be connected, when needed, to have a common axis of rotation. Any arrangement is acceptable provided that the rotation of the pawl wheel 20 is reliably transmitted, via the shaft member 12b, to the trigger member 12 to rotate the trigger member 12. The trigger member 12 is provided with a plurality of radially arranged projections 12a. When the trigger member 12 is turned, one projection 12a engages the end 8c of the hammer member 8 at a time (see FIG. 3). These projections 12a are made of an insulating material such as synthetic resin so that the electricity from the piezoelectric element 7 is not conducted through them.

With this configuration, to ignite, one turns the bottom cover 16 counterclockwise as indicated by an arrow E in FIG. 8. The rachet gear 21 turns together with the bottom cover 16 in the direction E, and the teeth 21a formed on the inner circumference of the ratchet gear 21 engage a plurality of pawls 20a protrudingly formed on the pawl wheel 20 (see FIG. 8). As a result, the pawl wheel 20 also turns in the direction E, and the trigger member 12 connected to the pawl wheel 20 turns in the same direction. Moreover, together with the rotation of the trigger member 12, one of the projections 12a on the trigger member 12 will engage the end 8c of the hammer member 8, bending the hammer member 8 away from the piezoelectric element 7. When the bottom cover 16 is rotated further, the engagement between the projection 12a of the trigger member 12 and the end 8c of the hammer member 8 will be released. The hammer member 8 will be moved by the elastic spring force of the hammer member 8 (which is a leaf spring) to strike one end 7b of the piezoelectric element 7 and generate a voltage across the ends of the piezoelectric element 7. This voltage appears across the bulb 9, and ignition, therefore, can be easily accomplished by simply turning the bottom cover.

On the other hand, if the bottom cover 16 is rotated in the direction opposite to the direction of the arrow E or clockwise as seen in FIG. 8, the ratchet gear 21 will turn together with the bottom cover 16 in the direction opposite to the direction of E. At the same time, the pawl wheel 20 and the trigger member 12 will be turned just a little by friction in the direction opposite to the direction E. However, when one of the projections 12a of the trigger member 12 engages the end 8c of the hammer member 8 to force the hammer member 8 towards and against the piezoelectric element 7, the trigger member 12 will not be able to turn anymore since the piezoelectric element 7 is fixed onto the lower cover 6a of the ignition apparatus. If the bottom cover 16 is rotated further clockwise, the pawls 20a of the pawl wheel 20 will be bent and released from the engagement with the teeth 21a of the ratchet gear 21. Then the pawl wheel 20 will not turn anymore, and the ratchet gear 21 will run idle and the rotation of the bottom cover 16 will not be transmitted to the trigger member 12 (see FIG. 8). Accordingly, even if the bottom cover 16 is rotated in the wrong direction, excessive forces will not be exerted on the trigger member 12, hammer member 8, piezoelectric element 7 and their fixing parts. In this way, inadvertent ignition, for example, due to vibration, etc. during transportation of the container, can be avoided, and any damage due to wrong operation can be prevented.

Furthermore, as shown in FIG. 4, the distance (insulation resistance) between the two sensing electrodes 11a and 11b is set much greater than the distance (insulation resistance) between the escaping discharge electrodes 10a and 10b made on the electric circuit component 100.

With this arrangement, when the container proper 1 is not filled with a content 2, when a desired content 2 is not present in the container proper 1, or when the container proper 1 is filled with only dry material, if the ignition operation is made, spark discharge will be generated only between the escaping discharge electrodes 10a and 10b having a smaller insulation resistance, and the ignition bulb 9 will not be energized. Hence the exothermic system 5 will never be ignited. By the term "escaping discharge electrodes" is meant a spark gap or breakdown type of device, having a breakdown voltage which is less than that between the sensing electrodes 11a and 11b.

When the container proper 1 is filled with a material 2 which comprises a material or materials having a fairly high conductivity relative to air, such as water, fluid of which main component is water, or a mixture of water or the fluid and a solid, the sensing electrodes 11a and 11b will be energized or conduct current through the material 2, and when the ignition operation is made, the spark discharge will be generated between the electrodes of the ignition bulb 9 having the smallest insulation resistance. At the same time, the ignition agent 9j coated over the electrode 9d will be ignited, and a temperature almost as high as 1000° C. will be generated instantly. As a result, the exothermic system 5 will be ignited to start heat generation.

As disclosed in the Japanese Patent Provisional Publication Nos. 1-288218 and 2-7918, the exothermic system 5 may be improved in its ignition performance, heat efficiency and heating speed by selecting, as one thinks fit, an oxidizing agent comprising metal oxides such as iron oxide, copper oxide and lead oxide, and a combustible material comprising metals such as titanium and iron or semi-metals such as silicon, the metals and semi-metals of the combustible material having a greater heat of oxidation than the metals of the oxidizing agent.

As for the insulator 4, it is sufficient to select an insulator which effectively adsorbs the slight odor and gas generated during the ignition and heat generation. For instance, zeolite is appropriate.

FIG. 9 shows one embodiment of the ignition apparatus 30 according to the present invention. The apparatus 30 basically has a configuration and an electric circuit both similar to those of the heating mechanism of the container having a heating function shown in FIG. 1. This ignition apparatus 30 differs from that of FIG. 1 in the following point: The insulator 4 is extended over sensing electrodes 11' so that the sensing electrodes 11' penetrate through a part of the insulator 4 and the sensing electrodes 11' are exposed on the exterior of the ignition apparatus 30, and seal packings 23 are provided for hermetic sealing. This ignition apparatus, therefore, may provide a convenient ignition apparatus which can be removably connected to a separate container filled with a liquid material to be heated such as stew to heat the separate container as one thinks fit.

The above-mentioned embodiment is a preferred embodiment of the present invention, and unnecessary restrictions should not be derived from it since persons skilled in the art can easily make changes and modifications within the scope of the invention. The scope of the present invention should be limited only by the claims.

According to the present invention, a voltage as high as several thousand volts is generated across the ends of the piezoelectric element by striking the piezoelectric element with the hammer member provided in the container with a heating function. When the container with a heating function is not filled with a liquid content, the gap between the sensing electrodes 11 is large and it is difficult to conduct current across them. Hence the circuit including the ignition bulb 9 is virtually disconnected. As a result, a spark discharge will be generated only across the spark gap between the escaping discharge electrodes 10 which are well separated from the exothermic system and are easy to discharge across them. No spark discharge will be generated between the electrodes of the ignition bulb, and ignition of the exothermic system will be avoided.

On the other hand, when the container with a heating function is filled with a material to be heated having a high conductivity compared to air, such material being water or fluid having water as the main component or a mixture of water or the fluid and a solid, electric current will be conducted across the sensing electrodes 11 through the liquid content present between the gap of the sensing electrodes 11a and 11b; thus the parallel circuit of FIG. 5 is closed. Under that condition, when a high voltage is generated between both the ends of the piezoelectric element, spark discharge will be generated between the ignition bulb 9 electrodes rather than between the escaping discharge electrodes 10 since the gap between the ignition bulb electrodes is smaller than that of the escaping discharge electrodes (i.e. the electric resistance of the ignition bulb electrodes is smaller). The ignition agent coated over the electrode will be ignited, and a high temperature will be produced instantly. As a result, the exothermic system will be ignited to generate heat, and this heat will heat up the content.

According to the present invention, when the container with a heating function is not filled with a liquid content, when the desired content is not present, or the container is filled with only a dry material, an inadvertent ignition operation will not ignite the exothermic system to generate heat. The container is arranged to heat the content only when the container is filled with a proper content in a proper quantity.

The heat conversion apparatus according to the present invention uses the ignition bulb 9 which is made by separately arranging a pair of electrodes to oppose each other in a container and filling and sealing up the container with oxygen. Hence the electric energy is instantly converted into thermal energy, and the heat can be generated at a high temperature. Moreover, to prevent wrong operation or inadvertent discharge from starting heat generation, the heat conversion apparatus can be made not to be actuated by a low temperature but a relatively high temperature by adjusting, for example, the electrodes. Thus the heat conversion apparatus can provide an extremely safe and highly reliable heat conversion apparatus for ignition. Furthermore, its production can be simplified, and a reduction in cost can be realized by mass production. It is most appropriate to use the heat conversion apparatus in the above-mentioned container with a heating function or the ignition apparatus according to the present invention.

The ignition apparatus in which the heat conversion apparatus is integrated does not require any complicated electric circuit for stabilizing and reducing electric pulses. Hence a simple and compact ignition apparatus can be provided. Since the heat conversion apparatus has a characteristic that it is not actuated by a relatively low voltage but a high voltage, even if one makes a wrong ignition operation, spark discharge due to electrostatic induction, electromagnetic induction, leakage or radiation of current will not be generated between the ignition discharge electrodes. Thus the ignition apparatus provides an ignition apparatus which is free of so-called improper operation.

Further, the hammer part of the pressure-exerting device, the escaping discharge device, and the sensing device are integrally formed together with conductors in a synthetic resin into an electric circuit component. Most of the members comprising the electric circuit of the ignition apparatus are thus formed into one unit member. In this way, the ignition apparatus production process can be simplified into simple steps of operation such as insertion of the piezoelectric element and insertion of the heat conversion apparatus. This, in turn, improves the production efficiency and mostly eliminates errors from production, and reduces the product cost.

Of the various components of the ignition apparatus, members other than the heat conversion apparatus including the ignition bulb are assembled in advance into a single unit, and the heat conversion apparatus is removably inserted into and connected with the unit. Since the heat conversion apparatus is a relatively delicate member, this arrangement makes it easy to handle the heat conversion apparatus in the production process. The arrangement also helps to prevent occurrence of a defective member, and also significantly simplifies replacement or repair of any defective member. Thus efficient and economic production will be accomplished.

The container with a heating function having the ignition apparatus with the heat conversion apparatus will not ignite to generate heat when the heated container is not filled with a material, when the heated container is filled with only a dry material, or when the container is not filled with the desired material. The invention thus provides the container with a heating function which is able to ignite to generate heat only when the container is filled with water or a fluid of which main component is water, or a mixture of water or the fluid and a solid. Accordingly, the present invention easily and inexpensively provides an extremely safe and convenient container with a heating function, which can be reliably ignited to generate heat by a much easier operation than before and will not be ignited by incorrect operation or vibration during transportation, etc.

What is claimed is:

1. An ignition apparatus for igniting an exothermic system comprising a piezoelectric element which, when receiving pressure, generates electricity, pressure-exerting means for applying pressure to said piezoelectric element,
   a heat conversion apparatus comprising a first sealed container filled within oxygen, a pair of electrodes extending into said first container and being arranged to oppose each other, wherein one of said electrodes being in the form of a needle and the other of said electrodes being coated with an ignition agent;
   a second container for containing a material desired to be heated, sensing means for sensing whether said second container is filled with said material, and
   discharge means for discharging electricity generated by said piezoelectric element at a location displaced from the exothermic system, said piezoelectric element being electrically connected in series with said sensing means and said heat conversion apparatus, and said discharge means being electrically connected across said piezoelectric element.

2. An ignition apparatus as set forth in claim 1, wherein of said heat conversion apparatus, said sensing means and said discharge means, said sensing means has the highest insulation resistance while said heat conversion apparatus has the lowest insulation resistance.

3. An ignition apparatus as set forth in claim 1 wherein said piezoelectric element, said pressure-exerting means, said heat conversion apparatus, said discharge means and said sensing means are arranged and connected in an integrally molded molding unit.

4. An ignition apparatus as set forth in claim 3, wherein said heat conversion apparatus is removably connected to said unit.

5. An ignition apparatus of claim 1, wherein said piezoelectric element, said pressure-exerting means, said discharge means and sensing means, are arranged and connected in an integrally molded molding unit, and said heat conversion apparatus is removably connected to said unit.

6. An ignition apparatus as set forth in claim 1, wherein said pressure-exerting device includes a hammer part, and said hammer part, said discharge means and the sensing means are integrally molded, together with electrical conductors, in a synthetic resin to form an electric circuit component, and said piezoelectric element and heat conversion apparatus are removably and electrically connected to said electric circuit component.

7. The ignition apparatus of claim 1 wherein said ignition agent comprises a material having a high resistance.

8. The ignition apparatus of claim 1 wherein said material to be heated is selected from the group consisting of water, a fluid having the main compartment of water, a mixture of water and a solid or a mixture of a fluid having the main component of water and a solid.

* * * * *